US011653589B2

(12) United States Patent
Harnetiaux (10) Patent No.: US 11,653,589 B2
(45) Date of Patent: May 23, 2023

(54) IMPLEMENT PROTECTION SYSTEM

(71) Applicant: CNH Industrial America LLC, New Holland, PA (US)

(72) Inventor: Travis Lester Harnetiaux, Bourbonnais, IL (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 1058 days.

(21) Appl. No.: 16/398,661

(22) Filed: Apr. 30, 2019

(65) Prior Publication Data

US 2020/0344938 A1 Nov. 5, 2020

(51) Int. Cl.
*A01B 73/06* (2006.01)
*B60Q 9/00* (2006.01)
*G01S 17/93* (2020.01)
*G01S 17/931* (2020.01)

(52) U.S. Cl.
CPC ............ *A01B 73/065* (2013.01); *B60Q 9/008* (2013.01); *G01S 17/931* (2020.01); *B60K 2370/178* (2019.05); *B60K 2370/179* (2019.05); *B60T 2201/022* (2013.01); *G05D 2201/0201* (2013.01)

(58) Field of Classification Search
CPC .. A01B 73/042; A01B 73/065; A01D 75/185; B60K 2370/178; B60K 2370/179; B60Q 9/008; B60T 2201/022; G01S 2013/9323; G01S 2013/9324; G05D 2201/0201; G06V 20/58

See application file for complete search history.

(56) References Cited

U.S. PATENT DOCUMENTS

| | | | |
|---|---|---|---|
| 4,524,356 A | 6/1985 | Kodera et al. | |
| 5,650,765 A | 7/1997 | Park | |
| 5,992,533 A | 11/1999 | Scarlett et al. | |
| 6,012,008 A | 1/2000 | Scully | |
| 6,067,024 A * | 5/2000 | Eckstine | G01S 13/93 |
| | | | 212/277 |
| 6,130,607 A | 10/2000 | McClanahan et al. | |
| 6,220,366 B1 * | 4/2001 | Noonan | A01B 73/046 |
| | | | 701/50 |
| 7,051,830 B2 | 5/2006 | Enomoto | |
| 7,076,366 B2 | 7/2006 | Simon et al. | |
| 7,224,088 B2 | 5/2007 | Shoemaker et al. | |
| 7,403,101 B2 | 7/2008 | Kropinski et al. | |

(Continued)

*Primary Examiner* — Peter D Nolan
*Assistant Examiner* — Ce Li Ll
(74) *Attorney, Agent, or Firm* — Rebecca Henkel; Rickard DeMille (57) ABSTRACT

An agricultural system that includes a towable agricultural implement. The towable agricultural implement includes a tow bar assembly. A wing tool bar pivotally couples to the tow bar assembly or to a work vehicle. The wing tool bar is configured to transition between a deployed configuration and a retracted configuration. A plurality of row units attach to the wing tool bar. An implement protection system detects an obstruction in a path of the towable agricultural implement. The implement protection system includes a proximity sensor coupled to the towable agricultural implement. The proximity sensor emits a proximity signal indicative of the obstruction. A controller couples to the proximity sensor and receives the proximity signal indicative of the obstruction and emits a warning signal.

19 Claims, 3 Drawing Sheets

(56) References Cited

U.S. PATENT DOCUMENTS

| | | | |
|---|---|---|---|
| 8,280,621 B2 | 10/2012 | Edwards et al. | |
| 9,164,955 B2 | 10/2015 | Lavoie et al. | |
| 9,999,171 B2* | 6/2018 | Magarity | A01B 63/002 |
| 10,149,468 B2* | 12/2018 | Crinklaw | A01M 7/0089 |
| 2011/0017480 A1* | 1/2011 | Thompson | A01D 78/146 |
| | | | 172/197 |
| 2011/0080277 A1 | 4/2011 | Traylor et al. | |
| 2011/0266365 A1* | 11/2011 | Hrnicek | A01C 23/008 |
| | | | 239/164 |
| 2014/0034341 A1* | 2/2014 | Fast | A01B 73/067 |
| | | | 172/311 |
| 2015/0206438 A1 | 7/2015 | Marsden et al. | |
| 2017/0006762 A1* | 1/2017 | Dienst | A01B 73/065 |
| 2017/0332543 A1* | 11/2017 | Magarity | A01B 73/046 |
| 2019/0200510 A1* | 7/2019 | Chrysanthakopoulos | |
| | | | B60K 17/28 |

* cited by examiner

IMPLEMENT PROTECTION SYSTEM

BACKGROUND

The present invention relates generally to the field of agricultural implements, such as planters and other implements towed behind a work vehicle.

A wide range of farm implements have been developed for tilling, planting, harvesting, and so forth. Seeders or planters, for example, are commonly towed behind tractors. Such devices typically open the soil, dispense seeds in the opening, and reclose the soil in a single operation. Seeds are commonly dispensed from seed tanks and distributed to row units by a distribution system. To make the seeding operation as efficient as possible, wide swaths of ground may be covered by extending wings from a central section of the implement. Included in the wing assemblies are tool bars, row units, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated by the support wheels to disengage the row units from the ground and folded forward to reduce the width of the implement. These farm implements operate proximate a variety of obstacles that may include: fences, windmills, buildings, trees, power poles, cell towers, among others. Contact with these obstacles may damage the obstacle and/or the farm implement.

BRIEF DESCRIPTION

In one embodiment, an agricultural system that includes a towable agricultural implement. The towable agricultural implement includes a tow bar assembly. A wing tool bar pivotally couples to the tow bar or to a work vehicle. The wing tool bar transition between a deployed configuration and a retracted configuration. A plurality of row units attach to the wing tool bar. An implement protection system detects an obstruction in a path of the towable agricultural implement. The implement protection system includes a proximity sensor coupled to the towable agricultural implement. The proximity sensor emits a proximity signal indicative of the obstruction. A controller couples to the proximity sensor and receives the proximity signal indicative of the obstruction and emits a warning signal.

In another embodiment, an agricultural system that includes a towable agricultural implement. The towable agricultural implement includes a tow bar assembly. A wing tool bar pivotally couples to the tow bar assembly or to an autonomous or semi-autonomous work vehicle. The wing tool bar folds to transition between a deployed configuration and a retracted configuration. A plurality of row units couple to the wing tool bar. An implement protection system detects an obstruction in a path of the towable agricultural implement. The implement protection system includes a proximity sensor coupled to the towable agricultural implement. The proximity sensor emits a proximity signal indicative of the obstruction. A controller couples to the proximity sensor and receives the proximity signal indicative of the obstruction and emits a warning signal. The autonomous or semi-autonomous work vehicle couples to the towable agricultural implement and moves the towable agricultural implement. The autonomous or semi-autonomous work vehicle receives the warning signal and maneuvers the towable agricultural implement with respect to the obstruction and/or cease movement of the towable agricultural implement.

In another embodiment, an implement protection system kit for a towable agricultural implement. The implement protection system kit includes a proximity sensor that couples to the towable agricultural implement. The proximity sensor emits a proximity signal indicative of an obstruction. A position sensor emits a first signal in response to a wing tool bar in an extended configuration and a second signal in response to the wing tool bar in a retracted configuration. A controller couples to the proximity sensor and the position sensor and emits a warning signal in response to detection of an obstacle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Agricultural implements are often are pulled and/or pushed through fields to perform a variety of agricultural operations, such as preparing soil, fertilizing, planting, and/or harvesting. These agricultural implements are typically wider than the work vehicle (e.g., tractor) that pulls and/or pushes them. The width of the agricultural implement facilitates efficient operation by enabling the agricultural implement to perform operations on wide swaths of ground during each pass. Because of the comparative width difference between the work vehicle and agricultural implement, the agricultural implement may encounter a greater number of obstacles. For example, the agricultural implement may encounter fences, windmills, buildings, trees, power poles, cell towers, among others. Contact with these obstacles may damage the obstacle and/or the farm implement.

Unfortunately, avoidance of these obstacles may be complicated by an operator's inability to see an obstacle, inability to accurately perceive distance between the obstacle and the agricultural implement, inability to determine the differences in the turning radiuses, or a general lack of situational awareness. Similar issues may arise with an unmanned work vehicle (e.g., autonomous or semi-autonomous work vehicle). For example, the unmanned work vehicle may not detect obstacles in the path (e.g., turning radius) of the agricultural implement due to the difference between the width of the work vehicle and the width of the implement.

As discussed in detail below, an agricultural system may include an implement protection system that enables detection of obstacles in the path of an agricultural implement. The implement protection system may include a plurality of proximity sensors that enable detection of an obstacle by a controller. The detection of the obstacle may then enable an operator and/or an unmanned system to manipulate the work vehicle to block or avoid contact between the agricultural implement and the obstacle.

Figure 1:
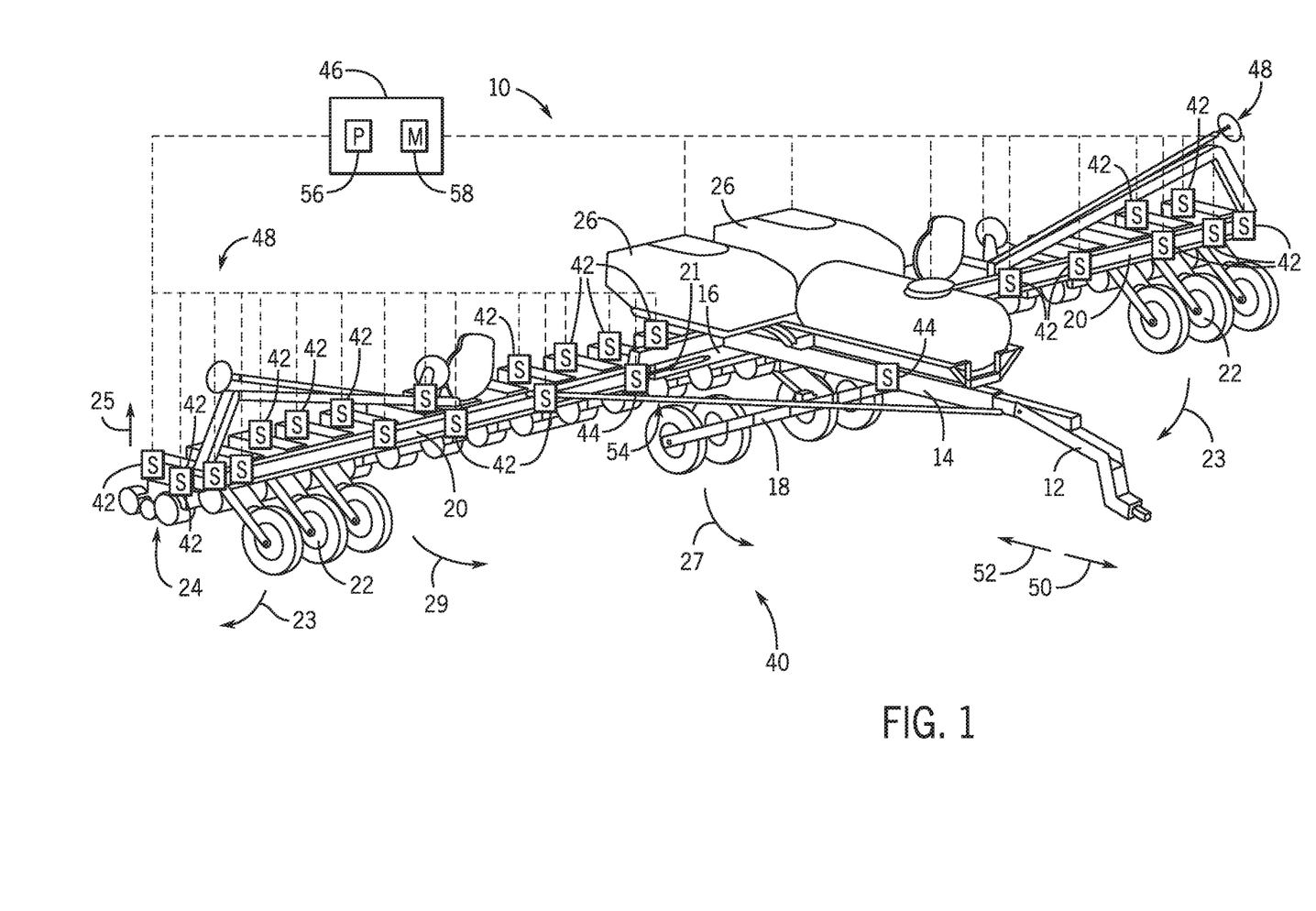
FIG. 1 is a perspective view an agricultural implement with wing assemblies that can be folded forward to a transport configuration, in accordance with an embodiment of disclosure.

Turning now to the drawings FIG. 1 illustrates an agricultural implement 10 (e.g., planter). The implement 10 is designed to be towed behind a work vehicle such as a tractor. The tractor may be manned and/or unmanned (e.g., autonomous or semi-autonomous). The implement 10 includes hitch assembly 12 which attaches to tow bar 14. Hitch assembly 12 may be used to attach the implement 10 to a tractor and may be pivotally coupled to tow bar 14 to allow flexibility as the planter implement changes elevation as it is towed across a terrain. Also included in implement 10 is central tool bar 16. Central tool bar 16 extends transversely with respect to the tow bar 14. In the illustrated embodiment, a central wheel assembly 18 is disposed below and coupled to tow bar 14 and/or central tool bar 16. The central wheel assembly 18 may include an actuator that extends the assembly to a transport or deployed configuration. The central wheel assembly 18 may have an upper member pivotally coupled to a central portion of tow bar 14 and/or central tool bar 16. A lower member is pivotally coupled to the upper member and may generally fold flat against the upper member when the central wheel assembly 18 is raised by the actuator that may be connected to the lower member and the tow bar 14. Further, central wheel assembly 18 may also be retracted when the implement 10 is in a planting or ground engaging configuration.

Wing tool bars 20 are disposed on each side of central tool bar 16. Wing tool bars 20 are pivotally coupled to central tool bar 16, enabling wing tool bars 20 to fold forward when the implement 10 is in a compacted transport configuration. When in the compacted transport configuration, wing tool bars 20 are generally perpendicular to the central tool bar 16. Wing wheel assemblies 22 are used to lift wing tool bars 20 from ground contact and engagement, thereby enabling implement 10 to move to a transport configuration. Wing wheel assemblies 22 may be retracted or extended to move the wing tool bars 20 from the ground engaging configuration to the transport configuration, respectively. As the wing wheel assemblies 22 extend, shown by arrow 23, row units 24 are lifted away from the ground, thereby changing the implement 10 from the planting or ground engaging configuration. In addition, actuators 21, such as hydraulic cylinders may be attached to central tool bar 16 and/or the tow bar 14 and each wing tool bar 20 to control the configuration and folding of wing tool bars 20. One or more actuators 21 may be attached to each of the two wing tool bars 20 in order to control the wings. The actuators 21 may be connected on each end, to the tow bar 14 and/or central tool bar 16 and each wing tool bar 20, by pins or other pivoting means. In an embodiment, wing wheel assemblies 22 may be extended while wing tool bars 20 are folded forward toward central tool bar 16. When the wing tool bars 20 are fully folded, they may be elevated over tow bar 14. Wing wheel assemblies 22 may then be retracted, enabling the wing tool bars 20 to lock to the tow bar 14, and enabling the wheels to interleave, thereby reducing the overall width of the implement 10 when in a compacted transport configuration. As the wing wheel assemblies 22 are retracted, the central wheel assembly 18 may be extended in direction 27, to elevate the implement 10 in transport mode.

Attached to wing tool bars 20 are wing row units 24. Wing tool bars 20 support the row units 24, which are designed to dispense seeds along parallel rows and at a desired spacing in a field. Depending upon the design of the row units 24 and upon such factors as the nature of the field (e.g., tilled or untilled), each row unit 24 may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit 24 for receiving seeds, fertilizer or other materials to be dispensed by the row units 24. A distribution system serves to communicate seeds from seed tanks 26 to the various row units 24.

When wing wheel assemblies 22 are extended in a downward and rearward direction 23 to an extended configuration, wing row units 24 are lifted in an upward direction 25 and away from the ground below. Moreover, the central wheel assembly 18 may also be extended in a downward and forward direction 27, toward the tractor, to a deployed configuration, further lifting row units 24. When extended, the central wheel assembly 18 may provide increased clearance for the implement 10 during transport. Wing tool bars 20 may be folded in a forward direction 29 while wing row units 24 are elevated, enabling wing tool bars 20 to fold inward toward tow bar 14.

When wing tool bars 20 are completely folded in the forward direction 29, wing wheel assemblies 22 may be raised and retracted in order to enable wing tool bars 20 to be secured to the tow bar 14 or the hitch assembly 12, thereby relieving the load sustained by the wing actuators 21. The central wheel assembly 18 may be fully extended in the direction 27 to the transport configuration, lifting wing wheel assemblies 22 out of ground contact when the wing tool bars 20 are completely folded. In the folded configuration, the individual wheels of wheel assemblies 22 may interleave, thereby reducing the overall transport width of implement 10. This configuration may be referred to as the compacted transport configuration.

In order to block and/or reduce contact between the implement 10 and an obstacle, the implement 10 includes an implement protection system 40. As will be discussed below, the implement protection system 40 enables obstacle avoidance when the implement 10 is in either the deployed configuration or the transport configuration. The implement protection system 40 includes a plurality of proximity sensors 42 and position sensors 44 that couple to a controller or computer system 46.

The proximity sensors 42 may couple to the implement 10 in a variety of locations. For example, the proximity sensors 42 may couple to row units 24, to wing tool bars 20, the tanks 26, markers 48, among other locations. In operation, the proximity sensors 42 sense the presence of an obstruction(s) and emits a signal indicative of the presence of the obstruction. By including a plurality of proximity sensors 42, the implement protection system 40 may enable obstruction detection as the implement 10 moves forward in direction 50 as well as backward in direction 52. The resolution of the implement protection system 40, may also be increased by including multiple proximity sensors 42 spaced away from each other by a desired distance. In other words the ability of the implement protection system 40 to detect small obstructions (e.g., people, small animals) may increase with the number of proximity sensors 42 on the implement 10. For example, a proximity sensor 42 may couple to each of the row units 24, and/or a proximity sensor 42 may couple to the central tool bar 16 and wing tool bars 20 at desired intervals.

The proximity sensors 42 may include ultrasonic sensors, electromagnetic sensors, optical sensors (e.g., cameras), radar sensors, LIDAR sensors, etc. In some embodiments, the implement protection system 40 may include different types of proximity sensors 42 to provide redundant detection of obstructions. For example, the controller 46 may receive signals from an optical sensor as well as a radar sensor. In operation, the controller 46 compares the signals from the optical sensor and the radar sensor to confirm detection of an obstruction(s). In addition to redundant detection of obstructions, the implement protection system 40 may include different types of proximity sensors 42 in order to provide detection and tracking of particulate in different kinds of weather (e.g., rain, snow) and/or light conditions (e.g., night, morning, day, evening). For example, an optical sensor, such as a camera, may not be able to detect particulate at night or in lowlight conditions. Accordingly, by including another type of proximity sensor 42, such as radar or LIDAR, the implement protection system 40 may still detect obstructions in different conditions (e.g., low light, rain, fog).

As explained above, the implement 10 includes foldable wing tool bars 20 that enable the implement 10 to reduce its width. For example, the wing tool bars 20 may be folded to facilitate transport to and from different work sites (e.g., fields). As will be explained below, the implement protection system 40 may detect the configuration of the wing tool bars 20 with respect to the tow bar 14 and/or the central tool bar 16. The implement protection system 40 may detect the configuration of the wing tool bars 20 with the position sensors 44. For example, the position sensors 44 may detect movement of the actuator 21 (e.g., extension and retraction of the hydraulic cylinder). The position sensors 44 (e.g., angular position sensors) may also detect rotation of hinges 54 that couple the wing tool bars 20 to the central tool bar 16. In still other embodiments, the position sensors 44 may also be proximity sensors that detect how close the wing tool bars 20 are to the tow bar 14 or another part of the implement 10. In other words, the position sensors 44 may also be ultrasonic sensors, electromagnetic sensors, optical sensors (e.g., cameras), radar sensors, LIDAR sensors, etc. As will be discussed below, determining the configuration of the implement 10 may enable an operator or unmanned system to interpret the location of obstructions relative to the implement 10.

The controller 46 may be located on the implement 10, on a tractor pulling the implement 10, and/or remotely located (e.g., maintenance shop, operation center). The controller 46 includes one or more processors 56, such as the illustrated microprocessor, and one or more memory devices 58. The controller 46 may also include one or more storage devices and/or other suitable components. The processor 56 may be used to execute software, such as software that processes signals from the proximity sensors 42 and the position sensors 44. Moreover, the processor 56 may include multiple microprocessors, one or more "general-purpose" microprocessors, one or more special-purpose microprocessors, and/or one or more application specific integrated circuits (ASICS), or some combination thereof. For example, the processor 56 may include one or more reduced instruction set (RISC) processors.

Memory device 58 may include a volatile memory, such as random access memory (RAM), and/or a nonvolatile memory, such as read-only memory (ROM). Memory device 58 may store a variety of information and may be used for various purposes. For example, memory device 58 may store processor executable instructions (e.g., firmware or software) for the processor 56 to execute. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data.

Figure 2:
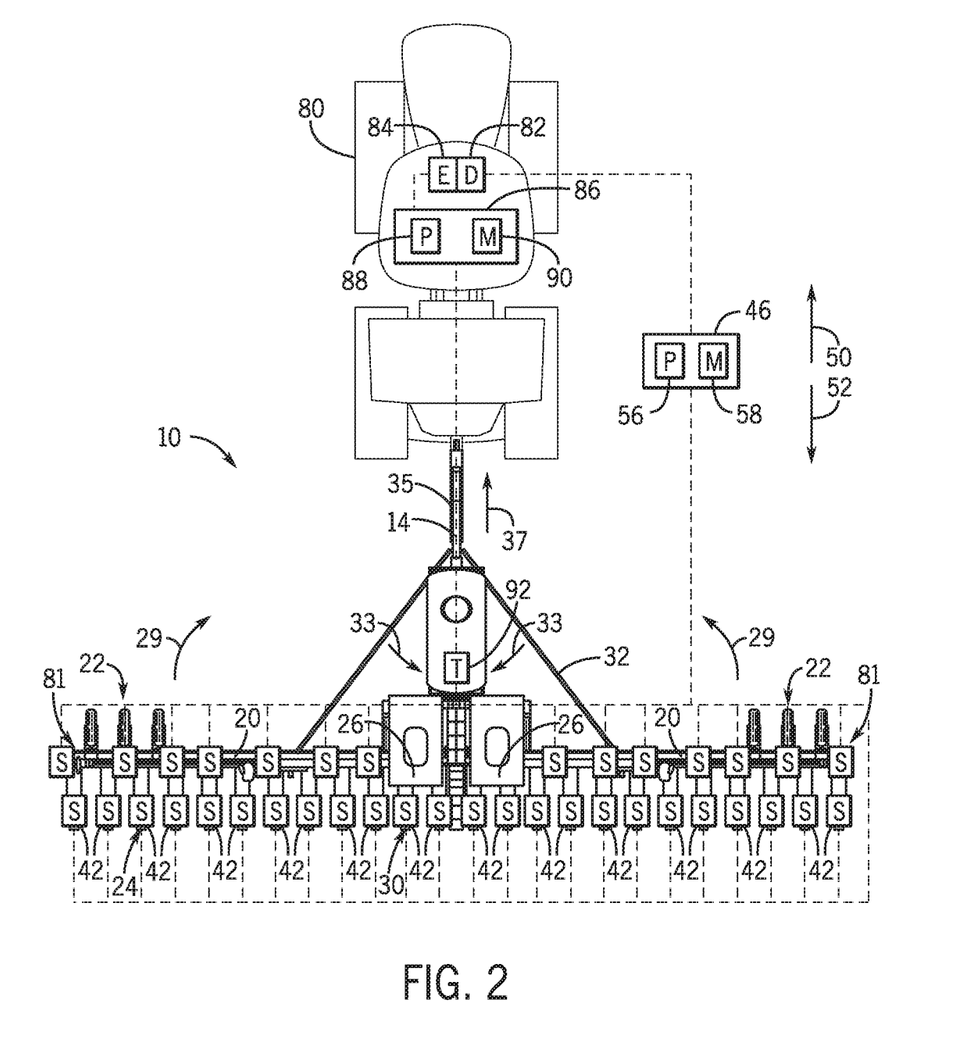
FIG. 2 is a top view of the agricultural implement in FIG. 1, in accordance with an embodiment of disclosure.

FIG. 2 shows a top view the implement 10 coupled to a tractor or work vehicle 80. As explained above, the implement protection system 40 detects the presence of obstructions in the path of the implement 10 to enable an operator and/or unmanned system to control the position of the implement 10 relative to the obstruction. The implement protection system 40 may detect obstructions in a forward direction of travel 50, a rearward direction of travel 52, and/or obstructions near the sides or ends 81 of the implement 10.

Signals from the sensors 42 indicative of the obstruction are transmitted to the controller or computer system 46. The controller 46 interprets these signals and emits a warning signal if an obstruction is detected. The warning signal is then transmitted to the work vehicle 80. For example, if the work vehicle 80 includes an operator, the warning signal may be transferred to a display 82 and/or emitter 84 (e.g., speaker). The display 82 may indicate the type of obstruction, distance to the obstruction, a picture of the obstruction, time to contact at current speed, written instructions on how to avoid (e.g., stop, turn left, turn right), instructions in the form of images (e.g., images turning right, images turning left, images stopping, symbols), and/or a combination thereof. For example, the display 82 may alternatingly flash between a readout of a distance to the obstruction and an instruction on how to avoid the obstruction. In addition to providing a warning through the display 82, the emitter 84 may also provide audio warnings to the operator. The audio warnings may include type of obstruction, distance to the obstruction, time to contact at current speed, instructions on how to avoid (e.g., stop, turn left, turn right), and/or a combination thereof.

In an embodiment with an autonomous or semi-autonomous work vehicle 80, the controller 46 may send the warning signal to a controller 86 that controls operation of the work vehicle 80. The controller 86 may include a processor 88 and a memory 90. When the controller 86 receives the warning signal, the controller 86 executes instructions stored on the memory 90 with the processor 88 to control operation of the work vehicle 80 (e.g., maneuver the implement 10 with respect the obstruction). These instructions may include actuation of the brakes, actuation of various actuators for changing the direction of the wheels/tracks, changing the speed of the work vehicle 80, among others. If the work vehicle 80 is a semi-autonomous vehicle, the controller 86 may control the work vehicle 80 in addition to activating the display 82 and/or the emitter 84 to provide warning messages and instructions to an operator riding along in the work vehicle 80. The controller 86 thereby enables an operator to take over and maneuver the semi-autonomous work vehicle 80 with respect to the obstacle.

The controller 46 may be located in a variety of locations. For example, the controller 46 may be coupled to the implement 10, co-located with the work vehicle 80, and/or remotely located (e.g., operations center, warehouse). If the controller 46 is remotely located and/or co-located with the work vehicle 80, the implement 10 may include a transmitter 92 that receives signals from the sensors 42 and 44. After receiving the sensor signals, the transmitter 92 transmits the signals to the controller 46. For example, the transmitter 92 may transmit the signals through various wireless networks (e.g., wireless, Bluetooth, cellular). In embodiments where the controller 46 is co-located with the work vehicle 80, the transmitter 92 and the controller 46 may be coupled with a wired connection and/or a wireless connection.

Figure 3:
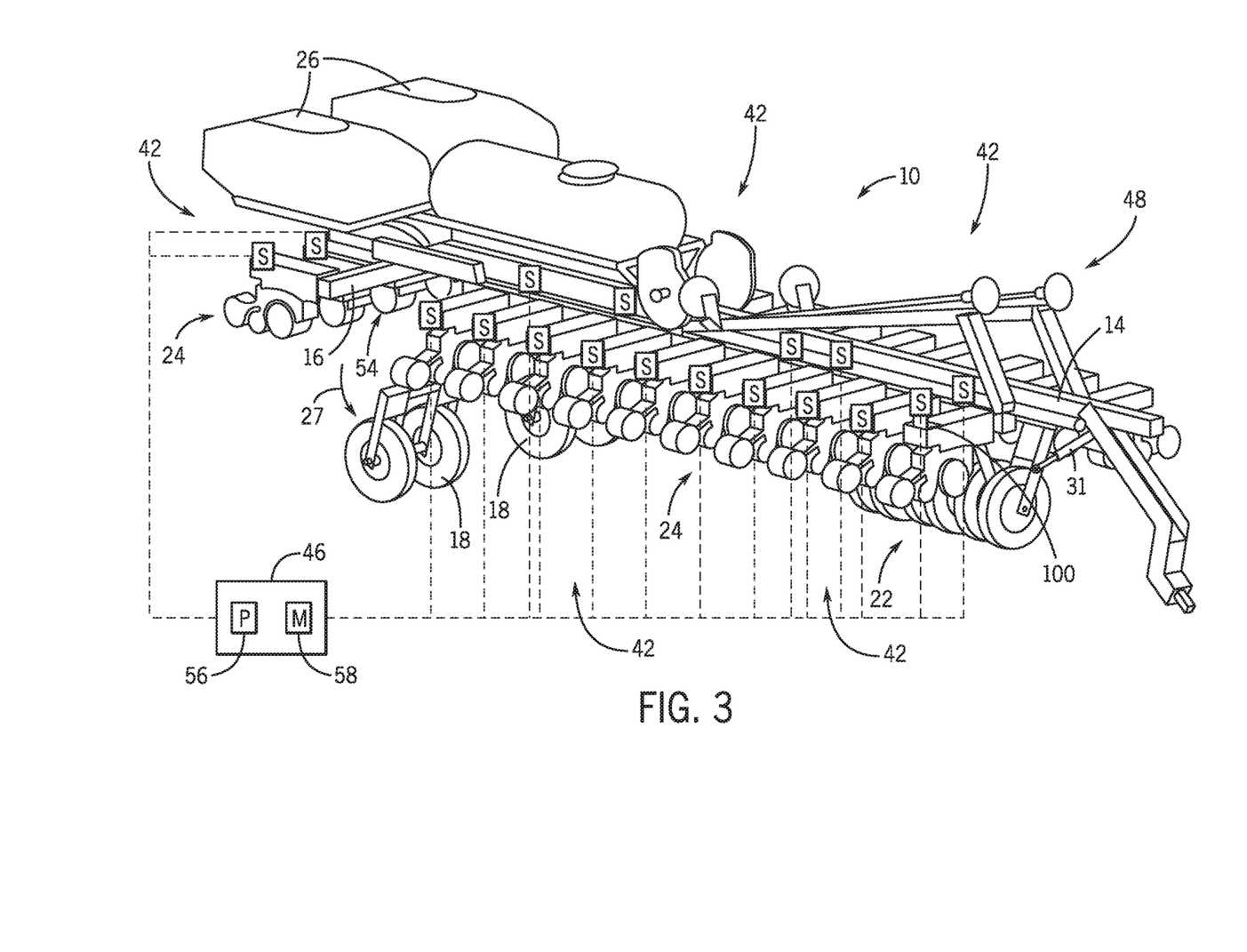
FIG. 3 is a perspective view of the agricultural implement in FIG. 1 in a transport configuration, in accordance with an embodiment of disclosure.

FIG. 3 is a perspective view of the implement 10 in the compacted transport configuration. In the transport configuration, the central wheel assembly 18 is extended and central row units 24 are elevated out of contact with the ground. As explained above, the implement 10 may have a three section tool bar, wherein the row units 24 attached to the central tool bar 16 remain stationary as the wing row units 24 are folded forward to a transport configuration. The wing wheel assemblies 22 are shown interleaving, where a left wing wheel is positioned on one side or on both sides of a right wing wheel. Wing wheel assemblies 22 may be extended or retracted by actuator 31. In some embodiments, the implement 10 may have a different number of sections, such as 2, 3, 4, 5, or more.

As explained above, the foldable wing tool bars 20 open and close in response to actuation of one or more actuators 21 (shown in FIG. 1). The implement protection system 40 may detect whether the implement 10 is in a transport configuration or a deployed configuration by detecting the configuration of the wing tool bars 20 with respect to the tow bar 14 and/or the central tool bar 16. The implement protection system 40 may detect the configuration of the wing tool bars 20 with one or more position sensors 44 (seen in FIG. 1). For example, the position sensors 44 may detect movement of the actuator 21 (e.g., extension and retraction of the hydraulic cylinder). In some embodiments, the position sensors 44 (e.g., angular position sensors) may also detect rotation of hinges 54 that couple the wing tool bars 20 to the central tool bar 16. In some embodiments, proximity sensors 42 may be used to detect the configuration of the wing tool bars 20, by detecting the proximity of the wing tool bars 20 to the tow bar 14. In still other embodiments, a combination of the position sensors 44 and the proximity sensors 42 may be used to determine whether the implement 10 is in a deployed or retracted configuration.

By determining the configuration of the implement 10, the implement protection system 40 is able to determine if the obstacle is to the side, front, or rear of the implement 10. For example, if the wing tool bars 20 are deployed, then an obstacle detected using the proximity sensors 42 coupled to the wing tool bars 20 would be in the front or rear of the wing tool bars 20. Likewise, if the wing tool bars 20 are retracted, obstacle detection using proximity sensors 42 on the wing tool bars 20 would indicate that the obstacle is to the side of the implement 10. In this way, the implement protection system 40 enables an operator, a semi-autonomous work vehicle, an autonomous work vehicle to determine and understand the position of obstacles relative to the implement 10 when the implement is in different configurations. The operator, semi-autonomous work vehicle, autonomous vehicle may then maneuver the implement 10 relative to the obstruction. For example, the implement protection system 40 may assist an operator, a semi-autonomous work vehicle, or an autonomous work vehicle avoid obstacles such as the door frames (e.g., barn door frames, shed door frames), shed walls, sides of gates, people, animals etc. while moving the implement 10 in a transport configuration as well as a deployed configuration.

The implement protection system 40 may be provided in the form of a kit and retroactively installed to the implement 10 and the work vehicle 80. That is, the proximity sensors 42, position sensors 44, controller 46, and transmitter 92 may be purchased as a kit. In some embodiments, the kit may also include brackets 100 that enable coupling of the sensors 42, 44 to the row units 24; the tool bars 16, 20; and/or other components of the implement 10.

It should be understood that the toolbars 20 described above may be rotated in different ways depending on the implement 10. For example, the toolbars 20 may be rotated rearward, rotated upwards, rotated downwards, etc. depending on the deployed and retracted configurations of the implement 10. In these various configurations, implement protection system 40 still enables detection of obstacles in the path of an agricultural implement 10, which enables an operator and/or an unmanned system to manipulate the work vehicle to block or avoid contact between the agricultural implement 10 and the obstacle.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system, comprising:
 a towable agricultural implement configured to be towed by a work vehicle, wherein the towable agricultural implement comprises:
  a wing tool bar configured to couple to a tow bar assembly or the work vehicle, wherein the wing tool bar is configured to transition between a deployed configuration and a retracted configuration; and
  a plurality of row units attached to the wing tool bar; and
 an implement protection system configured to detect an obstruction in a path of the wing tool bar, wherein the implement protection system comprises:
  a proximity sensor coupled to the wing tool bar, wherein the proximity sensor is configured to output a proximity signal indicative of presence of the obstruction in the path of the wing tool bar; and
  a controller coupled to the proximity sensor, wherein the controller is configured to:
   receive the proximity signal;
   detect the presence of the obstruction based on the proximity signal;
   determine whether the wing tool bar is in the deployed configuration or the retracted configuration;

determine the obstruction is on a side of the towable agricultural implement in response to determining the wing tool bar is in the retracted configuration;
determine the obstruction is in front of or behind the towable agricultural implement in response to determining the wing tool bar is in the deployed configuration; and
output a warning signal in response to detecting the presence of the obstruction, wherein the warning signal is indicative of whether the obstruction is on the side of the towable agricultural implement or the obstruction is in front of or behind the towable agricultural implement.

2. The agricultural system of claim 1, comprising a display configured to receive the warning signal and to display a warning.

3. The agricultural system of claim 2, wherein the warning comprises instructions on how to avoid the obstruction.

4. The agricultural system of claim 1, comprising an emitter configured to receive the warning signal and to emit a warning noise.

5. The agricultural system of claim 1, comprising the work vehicle configured to couple to the towable agricultural implement, wherein the work vehicle is configured to receive the warning signal.

6. The agricultural system of claim 1, wherein the proximity sensor comprises at least one of an ultrasonic sensor, an electromagnetic sensor, an optical sensor, a radar sensor, or a LIDAR sensor.

7. The agricultural system of claim 1, wherein the implement protection system comprises a second proximity sensor coupled to the wing tool bar, and the controller is coupled to the second proximity sensor.

8. The agricultural system of claim 1, wherein the implement protection system comprises a position sensor configured to output a position signal indicative of a position of the wing tool bar, and the controller is configured to determine whether the wing tool bar is in the deployed configuration or the retracted configuration based on the position of the wing tool bar.

9. An agricultural system, comprising:
a towable agricultural implement configured to be towed, wherein the towable agricultural implement comprises:
a wing tool bar configured to couple to a tow bar assembly or an autonomous or semi-autonomous work vehicle, wherein the wing tool bar is configured to transition between a deployed configuration and a retracted configuration; and
a plurality of row units attached to the wing tool bar;
an implement protection system configured to detect an obstruction in a path of the wing tool bar, wherein the implement protection system comprises:
a proximity sensor coupled to the wing tool bar, wherein the proximity sensor is configured to output a proximity signal indicative of presence of the obstruction in the path of the wing tool bar; and
a controller coupled to the proximity sensor, wherein the controller is configured to:
receive the proximity signal;
detect the presence of the obstruction based on the proximity signal;
determine whether the wing tool bar is in the deployed configuration or the retracted configuration;
determine the obstruction is on a side of the towable agricultural implement in response to determining the wing tool bar is in the retracted configuration;
determine the obstruction is in front of or behind the towable agricultural implement in response to determining the wing tool bar is in the deployed configuration; and
output a warning signal in response to detecting the presence of the obstruction, wherein the warning signal is indicative of whether the obstruction is on the side of the towable agricultural implement or the obstruction is in front of or behind the towable agricultural implement; and
the autonomous or semi-autonomous work vehicle configured to couple to the towable agricultural implement and to move the towable agricultural implement, wherein the autonomous or semi-autonomous work vehicle is configured to receive the warning signal and to maneuver the towable agricultural implement with respect to the obstruction, cease movement of the towable agricultural implement, or a combination thereof, based on the warning signal.

10. The agricultural system of claim 9, comprising a wing actuator coupled to the wing tool bar, wherein the wing actuator is controllable to transition the wing tool bar between the retracted configuration and the deployed configuration.

11. The agricultural system of claim 9, wherein the proximity sensor comprises at least one of an ultrasonic sensor, an electromagnetic sensor, an optical sensor, a radar sensor, or a LIDAR sensor.

12. The agricultural system of claim 9, wherein the implement protection system comprises a second proximity sensor coupled to the wing tool bar, and the controller is coupled to the second proximity sensor.

13. The agricultural system of claim 9, wherein the implement protection system comprises a position sensor configured to output a position signal indicative of a position of the wing tool bar, and the controller is configured to determine whether the wing tool bar is in the deployed configuration or the retracted configuration based on the position of the wing tool bar.

14. An implement protection system for a towable agricultural implement, the implement protection system comprising:
a proximity sensor configured to couple to a wing tool bar of the towable agricultural implement, wherein the wing tool bar is configured to transition between a deployed configuration and a retracted configuration, and the proximity sensor is configured to output a proximity signal indicative of presence of an obstruction in a path of the wing tool bar; and
a controller coupled to the proximity sensor, wherein the controller is configured to:
receive the proximity signal;
detect the presence of the obstruction based on the proximity signal;
determine whether the wing tool bar is in the deployed configuration or the retracted configuration;
determine the obstruction is on a side of the towable agricultural implement in response to determining the wing tool bar is in the retracted configuration;
determine the obstruction is in front of or behind the towable agricultural implement in response to determining the wing tool bar is in the deployed configuration; and
output a warning signal in response to detecting the presence of the obstruction, wherein the warning signal is indicative of whether the obstruction is on the side of the towable agricultural implement or the obstruction is in front of or behind the towable agricultural implement.

15. The implement protection system of claim 14, wherein the proximity sensor comprises at least one of an ultrasonic sensor, an electromagnetic sensor, an optical sensor, a radar sensor, or a LIDAR sensor.

16. The implement protection system of claim 14, comprising a second proximity sensor configured to couple to the wing tool bar, wherein the controller is coupled to the second proximity sensor.

17. The implement protection system of claim 14, comprising a position sensor configured to output a position signal indicative of a position of the wing tool bar, wherein the controller is configured to determine whether the wing tool bar is in the deployed configuration or the retracted configuration based on the position of the wing tool bar.

18. The implement protection system of claim 14, comprising a display configured to receive the warning signal and to display a warning.

19. The implement protection system of claim 18, wherein the warning comprises instructions on how to avoid the obstruction.

\* \* \* \* \*